United States Patent
Hurst et al.

(10) Patent No.: US 8,286,533 B2
(45) Date of Patent: Oct. 16, 2012

(54) GEAR HOUSING

(75) Inventors: Richard Hurst, Offenburg (DE);
Christian Sauer, Schutterwald (DE);
Martin Heyder, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 489 days.

(21) Appl. No.: 12/519,196

(22) PCT Filed: Oct. 17, 2007

(86) PCT No.: PCT/EP2007/061054
§ 371 (c)(1),
(2), (4) Date: Aug. 10, 2009

(87) PCT Pub. No.: WO2008/071486
PCT Pub. Date: Jun. 19, 2008

(65) Prior Publication Data
US 2009/0301256 A1    Dec. 10, 2009

(30) Foreign Application Priority Data
Dec. 15, 2006  (DE) .......................... 10 2006 059 347

(51) Int. Cl.
*F16H 57/02* (2012.01)
(52) U.S. Cl. .................................... 74/606 R
(58) Field of Classification Search ............... 74/606 R; 15/250.3; 277/628
See application file for complete search history.

(56) References Cited

U.S. PATENT DOCUMENTS

| | | | |
|---|---|---|---|
| 2,358,607 A * | 9/1944 | Tinnerman | 292/87 |
| 6,053,072 A * | 4/2000 | Schleuder | 74/606 R |
| 6,163,096 A * | 12/2000 | Michenfelder et al. | 310/239 |
| 6,224,058 B1 | 5/2001 | Drebing et al. | |
| 6,561,522 B1 * | 5/2003 | Radelet et al. | 277/628 |
| 6,977,458 B2 * | 12/2005 | Kraus et al. | 310/239 |
| 2003/0107185 A1 | 6/2003 | Matsuki | |
| 2005/0109155 A1 * | 5/2005 | Oh et al. | 74/606 R |

FOREIGN PATENT DOCUMENTS

| | | |
|---|---|---|
| DE | 20314884 U1 | 12/2003 |
| EP | 1126196 A1 | 8/2001 |
| JP | 2002531758 | 9/2002 |
| JP | 2005094822 | 4/2005 |
| WO | 9609483 | 3/1996 |

OTHER PUBLICATIONS

PCT/EP2007/061054 International Search Report.

* cited by examiner

*Primary Examiner* — Vicky Johnson
(74) *Attorney, Agent, or Firm* — Michael Best & Friedrich LLP

(57) ABSTRACT

The invention relates to a gear housing (1) comprising a gear, particularly comprising a gear of a wiper device for motor vehicles, having a housing base body (4), having a housing cover (3) affixed at a distance to the housing base body (4) by means of a plurality of retaining clips (6) made of spring steel in circumferential direction, and having an annular seal (20) disposed between the housing base body (4) and the housing cover (3) and pressed against a support region (24) of the housing base body. The invention provides that the radial extension (y) of the support region is smaller than the radial extension (x, x') of the annular seal.

18 Claims, 1 Drawing Sheet

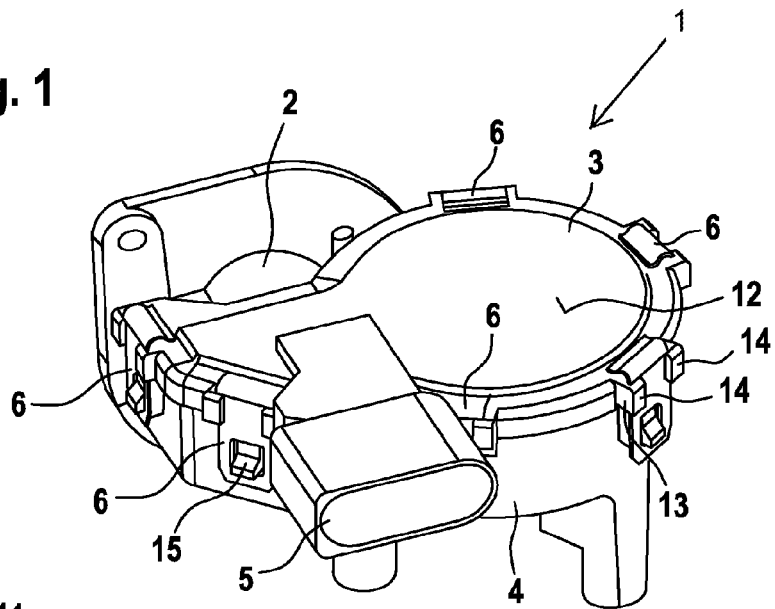
Fig. 1
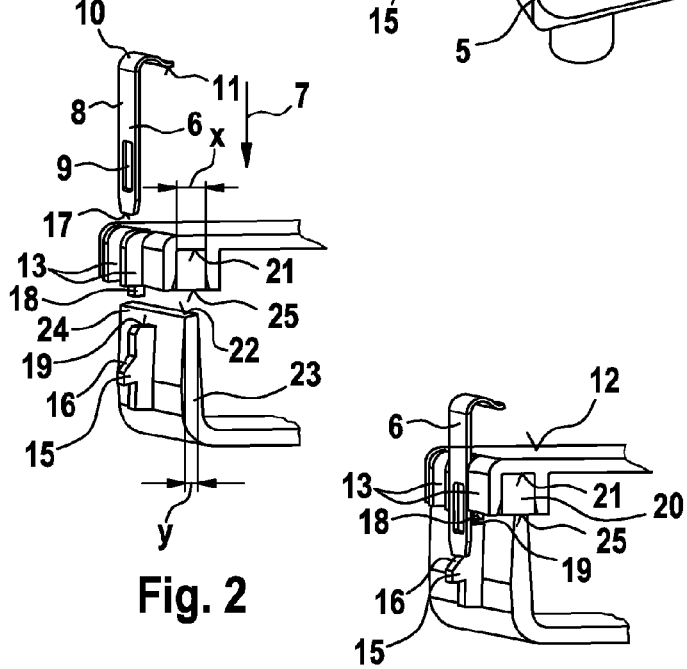
Fig. 2
Fig. 3
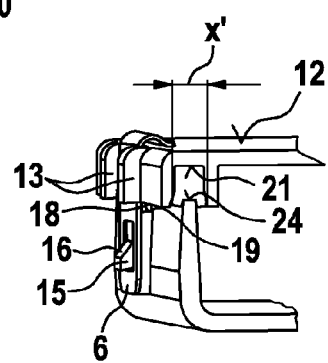
Fig. 4

GEAR HOUSING

BACKGROUND OF THE INVENTION

The invention relates to a gear housing with a gear unit.

Gear housings, in particular with an internal worm gear, having an electric drive motor flanged onto the gear housing and forming a constituent part of wiper systems for motor vehicles are known in a wide variety of designs.

The known gear housings generally comprise two half-shells, namely a housing base body and a housing cover secured to the housing base body, with a ring seal being provided between the housing cover and housing base body to prevent moisture from entering the gear housing. It is known practice to provide screws or rivets to secure the housing cover to the housing base body, in which case the ring seal arranged between the housing cover and housing base body is designed as a flat seal. This method of fastening is laborious and requires a large number of mounting steps to attach the screws or rivets. In another known technique, a housing cover which is formed from plastic and has integrated plastic clip tabs can be secured to the housing base body, with the plastic clip tabs engaging in corresponding latching lugs of the gear housing. The ring seals used in this case are profiled seals having a sealing edge directed toward the housing base body. A disadvantage with this method is that the plastic clips which are used are prone to breaking and the profiled seal is invariably costly and complicated to produce. It is also known to use plastic clips in combination with a seal which has a larger radial extension than the bearing region for the ring seal on the housing base body. This embodiment is advantageous in that ring seals without a sealing edge, which can be manufactured economically, can be used, but disadvantageous in that the plastic clips are prone to damage and do not always ensure sufficient seal compression. Additionally known is the use of retaining clips made of spring steel, these only being used in combination with profiled seals having a sealing edge, such seals being complicated and costly to produce. In this fastening method, the radial extension of the bearing region on the housing base body for the seal is larger than the radial extension of the ring seal. Consequently, the housing base body, at least in the contact region, must have a large radial extension which is actually not necessary for stability reasons, a situation which considerably increases the use of material and hence the manufacturing costs.

SUMMARY OF THE INVENTION

The problem addressed by the invention is to propose a gear housing which can be manufactured cost-effectively and in which a rigid connection is ensured between the housing base body and housing cover using fastening means which are little prone to damage.

The fundamental idea behind the invention is to combine spring-elastic retaining clips made of spring steel which are spaced apart over the circumference of the gear housing with a bearing region on the housing base body that is narrow in relation to the width of the seal. The provision of retaining clips made of spring steel (steel clips, retaining springs), which are designed in particular as separate components, ensures a rigid connection between the housing base body and housing cover. Furthermore, by contrast with plastic clips, retaining clips made of spring steel are not at risk of breaking, a factor which also makes mounting simpler or easier since the retaining clips do not need to be carefully handled and attention does not have to be paid to any possible damage of the retaining clips during mounting. Furthermore, the spring action of the retaining clips made of spring steel makes it possible to compensate for any manufacturing tolerances. The narrow bearing region, i.e. a bearing region having a small radial extension, has the advantage that savings can be made on the housing base body material, in particular aluminum, aluminum alloys or plastics, since the bearing region does not have to extend over the entire radial extension of the seal.

Owing to the saving on material, the housing base body, and hence the gear housing, can be produced cost-effectively while having sufficient stability. In the mounted state, the seal, by virtue of the seal compression, has a larger radial extension than in the non-mounted state. Preference is given to an embodiment in which the radial extension of the bearing region is even smaller than the radial extension of the seal in the non-mounted state.

In a development of the invention, provision is advantageously made for the bearing region of the housing base body to be formed by a planar circumferential edge face of the housing base body. In this arrangement, the bearing region preferably extends transversely with respect to the direction in which the housing cover is mounted on the housing base body. This results in a uniform seal compression over the entire radial extension of the bearing region.

The ring seal side facing the housing base body is preferably not provided with a sealing edge but has a planar design instead. In this case, directly before it is caused to deform by the mounting operation, the ring seal side facing the housing base body is preferably aligned parallel to the bearing region. The ring seal is preferably intended to be designed and to be compressed in such a way that it overlaps the bearing region in the direction of mounting the housing cover on the housing base body, i.e. in the pressing direction. The ring seal thus extends a fraction in the axial direction on both sides of the bearing region. In other words, the bearing region digs into the ring seal in the axial direction, thereby producing an optimum sealing action.

The flat design of the ring seal side facing the housing base body makes it possible to manufacture the ring seal as a cost-effective extruded profile preferably having a rectangular cross-sectional area. However, it is also conceivable for the ring seal to be applied to the finished housing cover by injection molding.

Preference is given to an embodiment in which the ring seal, particularly designed as an extruded profile, is accommodated in a receiving groove which is open in the direction of the housing base body. The groove is preferably designed in the region of the groove bottom as an angular U shaped profile, and hence in a dimensionally congruent manner with respect to the ring seal. The receiving groove advantageously widens, in particular conically, in the direction of the housing base body so as to allow a lateral, defined seal compression when the bearing region penetrates axially into the ring seal.

The provision of at least one stop on the housing base body on which the housing cover bears, in particular by way of a supporting lug extending in the axial direction, makes it possible to achieve a defined compression of the ring seal, substantially independently of the size of the spring force of the retaining springs made of spring steel. The retaining springs just need to be dimensioned such that contact is ensured at all times between the housing cover and the at least one stop.

Preference is given to an embodiment in which not only a single stop is provided on the housing, but in which each retaining clip is assigned a stop in order to provide reliable support in the regions subjected to the greatest force and hence to allow defined ring seal compression. A stop is preferably in each case arranged in a region radially between a retaining clip and the bearing region.

In order to be able to achieve a housing cover design which is as simple as possible, with the result that tooling costs are further reduced, an advantageous embodiment comprises designing the retaining clips in such a way that they directly exert a compressive force on the housing cover surface in the direction of the housing base body. In such an embodiment, latching projections on the cover for the retaining clips are preferably dispensed with.

To secure the retaining clips to the housing base body, each retaining clip is preferably assigned a latching lug on the housing base body that extends in the radial direction, it being the case that, in order to make it easier to mount the retaining clips, the latching lugs have a run-on ramp which is directed away from the housing cover and over which the axially lower sides of the retaining clips can slide during mounting so as then each to engage by way of a receiving opening behind the latching lug.

BRIEF DESCRIPTION OF THE DRAWINGS

Further advantages, features and details of the invention will become apparent from the following description of preferred embodiments and with reference to the drawing, in which:

FIG. 1 shows a perspective representation of a mounted gear housing having an internal worm gear and a flanged-on motor housing, FIG. 2 shows a perspective part view of a mounting step of the gear housing, FIG. 3 shows a part view of a subsequent mounting step of the gear housing and FIG. 4 shows a part view of the completely mounted gear housing.

DETAILED DESCRIPTION

In the figures, identical components having the same function are denoted by the same reference numbers.

FIG. 1 shows a gear housing 1 of a wiper system (not shown) for a motor vehicle. The gear housing 1 contains a worm gear which is accommodated in a motor housing 2 flanged onto the gear housing 1. The gear housing 1 shown is usually secured to a vehicle body-mounted fastening tube (not shown either).

The gear housing 1 comprises an upper (in the plane of the drawing) housing cover 3 made of plastic and, connected thereto, a housing base body 4 made of die-cast aluminum. Arranged on the housing cover 3 is a coded connection socket 5 for receiving a plug connector (not shown), inter alia for supplying the drive motor arranged in the motor housing 2 with electric current.

To secure the housing cover 3 to the housing base body 4, there is provided a plurality of retaining clips 6 made of spring steel which are spaced apart in the circumferential direction. Said clips each have an at least approximately flat axial portion which extends substantially in the mounting or pressing direction 7 and which is provided with a rectangularly contoured receiving opening 9. In an upper (in the plane of the drawing) region, the axial portion 8 merges into a radially inwardly and axially downwardly curved retaining portion 10 which is responsible for a spring action in the axial direction. In the mounted state (cf. FIG. 1 and FIG. 4), each retaining clip 6 bears on the housing cover upper side 12 by way of a respective contact edge 11 of the retaining portion 10. Latching projections on the housing cover 3 have been deliberately dispensed with.

In order to guide the retaining clips 6 during mounting and to secure the mounting position, each retaining clip 6 is assigned two guide projections 13 on the housing cover 3 (cf. FIGS. 2 to 4) which are spaced apart in the circumferential direction and which extend in the radial and axial directions. In the exemplary embodiment according to FIG. 1, the guide projections 13 are part of retention tabs 14 which engage behind the mounted retaining clips 6 in the circumferential direction and thus prevent unintentional release.

In the mounted state, the retaining clips 6 each engage by way of their respective receiving openings 9 behind a latching lug 15 which extends in the radial direction from the housing base body 4. Each latching lug 15 is provided with a run-on ramp 16 along which an underside 17 of the associated retaining clip 6 slides during mounting and at the same time is retained in an upper region of the axial portion 8 by the retention tabs. Therefore, the retaining clip 6 is resiliently deflected in a lower region.

As can be particularly clearly seen from FIG. 4, the housing cover 3 has supporting lugs 18 which are directed in the mounting direction 7 and by means of which, in the mounted state, the housing cover 3 bears against corresponding stops 19 on the housing base body 4 so as to ensure a defined compression of a ring seal 20 which is accommodated in a receiving groove 21 in the housing cover 3. In the non-mounted state, as can be seen particularly from FIGS. 2 and 3, the ring seal has a rectangular cross-sectional contour, the ring seal 20 in the non-mounted state having an extension x in the radial direction.

The receiving groove 21 is designed in a lower groove region to be dimensionally congruent with respect to the ring seal 20 and widens conically in the direction of the receiving groove opening. A circumferential edge face 22 of a circumferential wall 23 of the bowl-shaped housing base body 4 forms a substantially planar bearing region 24 which extends in the radial direction with a radial extension y, where the radial extension y of the bearing region 24 for the ring seal 20 corresponds approximately to half the radial extension x of the ring seal 20 in the non-mounted state and to approximately a third of the radial extension x' of the ring seal 20 in the mounted state, with the result that, as is particularly evident from FIG. 4, the ring seal 20 overlaps the planar bearing region 24 in the mounting direction 7, i.e. in the pressing direction, that is to say extends in the mounting direction 7 a fraction along both sides of the circumferential wall 23, with the result that the bearing region 24 is situated within the compressed sealing profile thus formed. The circumferential wall 23 therefore substantially forms a receiving groove profile in the ring seal 20 for the bearing region 24. Here, the lower lateral face 25 of the ring seal 20, which is parallel to the bearing region 24 in the non-mounted state, is substantially curved inwardly in an approximately U shape. As a result, the radial extension of the ring seal 24 broadens out (cf. FIG. 4) and said seal is pressed laterally in a defined manner by the widening portion of the receiving groove.

The mounting operation proceeds as follows. First, the ring seal 20 is inserted in the receiving groove 21, and the housing cover 3 is placed on the housing base body 4 in the mounting direction 7. Next, the retaining clips 6 are mounted by pushing them in the mounting direction 7. As the retaining clips 6 are being pushed, their respective underside 17 is pressed radially outwardly against the associated run-on ramp 16. The retention tabs 14 prevent the retaining clips 6 from slipping out in the radial direction and allow a resilient deflection of the free end of the retaining clip 6. Each retaining clip 6 then snaps radially inwardly as soon as the lower region of the receiving opening 9 has been guided in the mounting direction 7 past the latching lug 15, with the result that each retaining clip 6 engages behind the associated latching lug 15, while each retaining clip 6 bears by way of its respective contact edge 11 against the housing cover upper side 12. If required, latching projections may be provided on the housing cover upper side 12.

The invention claimed is:

1. A gear housing with a gear unit with a housing base body (4), with a housing cover (3) secured to the housing base body (4) by means of a plurality of retaining clips (6) made of spring steel which are spaced apart in the circumferential direction, and with a ring seal (20) which is arranged between the housing base body (4) and housing cover (3) and which is pressed against a bearing region (24) of the housing base body (4), characterized in that the radial extension (y) of the bearing region (24) is smaller than the radial extension (x, x') of the ring seal (20), characterized in that the ring seal (20) is arranged in a receiving groove (21) of the housing cover (3), characterized in that the receiving groove (21) defines a first width at a base of the receiving groove (21) and a second width at an opening of the receiving groove (21) and proximate the bearing region (24), wherein the second width is greater than the first width such that the ring seal (20) is permitted to widen adjacent the bearing region (24).

2. The gear housing as claimed in claim 1, characterized in that the bearing region (24) is formed by a planar circumferential edge face (22) of the housing base body (4).

3. The gear housing as claimed in claim 2, characterized in that the ring seal lateral face (25) directed toward the housing base body (4) is planar in the non-compressed state.

4. The gear housing as claimed in claim 3, characterized in that, in the compressed state, the ring seal (20) overlaps the bearing region (24) in the mounting direction (7).

5. The gear housing as claimed in claim 4, characterized in that the ring seal (20) is designed as an extruded profile, wherein the ring seal (20) defines a non-mounted width and a mounted width, and wherein the mounted width is greater than the non-mounted width.

6. The gear housing as claimed in claim 5, characterized in that the ring seal (20) is arranged in a receiving groove (21) of the housing cover (3) in an uncompressed state.

7. The gear housing as claimed in claim 6, characterized in that at least one stop (19) is provided on the housing base body (4) for supporting the housing cover (3).

8. The gear housing as claimed in claim 7, characterized in that each retaining clip (6) is assigned a stop (19).

9. The gear housing as claimed in claim 8, characterized in that the retaining clips (6) are designed and/or arranged so as to exert a compressive force on the housing cover upper side (12) in the direction of the housing base body (4).

10. The gear housing as claimed in claim 9, characterized in that the retaining clips (6) are retained by means of a receiving opening (9) against latching lugs (15) which extend in the radial direction from the housing base body (4) and which are provided with a run-on ramp (16) directed in the mounting direction (7).

11. The gear housing as claimed in claim 1, characterized in that the ring seal lateral face (25) directed toward the housing base body (4) is planar in the non-compressed state.

12. The gear housing as claimed in claim 1, characterized in that, in the compressed state, the ring seal (20) overlaps the bearing region (24) in the mounting direction (7).

13. The gear housing as claimed in claim 1, characterized in that the ring seal (20) is designed as an extruded profile, wherein the ring seal (20) defines a non-mounted width and a mounted width, and wherein the mounted width is greater than the non-mounted width.

14. The gear housing as claimed in claim 1, characterized in that the ring seal (20) is arranged in a receiving groove (21) of the housing cover (3) in an uncompressed state.

15. The gear housing as claimed in claim 1, characterized in that at least one stop (19) is provided on the housing base body (4) for supporting the housing cover (3).

16. The gear housing as claimed in claim 15, characterized in that each retaining clip (6) is assigned a stop (19).

17. The gear housing as claimed in claim 1, characterized in that the retaining clips (6) are designed and/or arranged so as to exert a compressive force on the housing cover upper side (12) in the direction of the housing base body (4).

18. The gear housing as claimed in claim 1, characterized in that the retaining clips (6) are retained by means of a receiving opening (9) against latching lugs (15) which extend in the radial direction from the housing base body (4) and which are provided with a run-on ramp (16) directed in the mounting direction (7).

\* \* \* \* \*